Patented Jan. 14, 1947

2,414,131

UNITED STATES PATENT OFFICE 2,414,131

FRUIT FLAVORED FOOD BRICK

Alexander M. Zenzes, New York, N. Y.

No Drawing. Application December 14, 1942,
Serial No. 468,997. In Mexico December 16,
1941

13 Claims. (Cl. 99—132)

This invention relates to the production of fruit flavored foods in substantially solid mass form such as in bricks and bars which are made particularly from cane juice and sugar compositions containing similar natural non-sugar impurities and less preferably from the sugar containing juices of other plants and various syrups including molasses or concentrates produced incidental to the refining of such sugars.

The impurities of the water extract of the sugar cane are objectionable tasting substances. For example, cane juice as expressed from the sugar cane is objectionable in flavor, readily fermentable, and subject to rapid inversion of the sucrose which it contains. The residual impurities as are present in blackstrap molasses, for example, are very bitter tasting and also objectionable for use as foods. It has now been found by treating such sugar containing solutions at certain concentrations and at certain pH ranges and particularly with the addition of a relatively small quantity of pectin a change takes place in these objectionable tasting substances whereby they are converted into substances having a desirable palatable fruity taste in highly stable condition.

For example, by acid reacting to a pH of between 2.5 and 3.6 and desirably between 3.1 and 3.5, the objectionable flavors of the impurities of the sugar cane are converted into a highly desirable fruit flavor and surprisingly in spite of the high acidity, the sucrose and invert sugars are retained in their respective ratios without further inversion and with perfect stability and keeping quality and there is no further inversion of the sucrose present.

Furthermore, when reduced to a solid condition by removal of water and the addition of a relatively small quantity of pectin, the solidified mass in brick or bar form contains sucrose which is surrounded and protected by a stable film comprising invert sugars, acid, water, acid reacted complexes which have been converted from the objectionable tasting substances comprising the non-sugar impurities and pectin, the pectin constituting the stabilizing agent for the mass. By adding the pectin the stability and flavor of the mass are enhanced.

An object of the present invention is therefore to provide a stable, nonfermentable, non-perishable, non-volatile, non-oxidizable solid mass in brick, bar, or other solid form in which the objectionable flavors of the impurities of the sugar cane have been reacted to produce a highly desirable fruit flavored food composition.

A further object is to produce a solid mass which may be readily solubilized and which may be readily dispersed with other aqueous food compositions. The solubilization and ready dispersion of the solid mass is a particularly important characteristic of the product produced by the present invention.

A still further object is to raise the economic value of relatively impure sugar cane materials which may be normally discarded as waste and by the process of the present invention to convert these materials into a highly desirable readily utilizable food composition having great value.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

In accordance with the present invention, cane juice which may have been defecated by treatment with lime or otherwise and which cane juice contains between 0.25% and 2.5% ash based upon total solids is acidified to between pH 2.5 and pH 3.6 and preferably to between pH 3.0 and pH 3.4, whereby a chemical reaction occurs between the non-sugar impurities of the cane juice and the added acid, and whereby a modification takes place in the objectionable tasting complexes changing them into highly desirable fruit aromas and flavors.

The acid reacted cane juice is then concentrated and further treated with pectin to produce the product of the present invention.

This treatment which requires at least about 30 to 45 minutes to complete causes a reaction between the acid and the sugar cane impurities whereby the objectionable flavors of the sugar cane impurities are changed into a highly desirable fruit aroma and flavor which is non-volatile and which will withstand long boiling periods even at temperatures of 250° F. to 260° F.

The acid reacted sugar cane juice is concentrated to between 85 and 95 Brix or the acid treatment may take place during or following concentrating.

To this acid reacted concentrated cane juice there is then added a relatively small amount, between 0.75% and 2.75% or more, and preferably between about 1% and 1.5% of pectin based upon the total sugar solids present in the continuous phase of the solidified mass.

Following agitation, the acid reacted cane juice containing the pectin may then be poured into molds, barrels, boxes, or similar containers and allowed to solidify, under which conditions a solid mass is formed in which the sucrose crystals are surrounded and protected by a film comprising invert sugar solids (as originally contained in the cane juice or as may have been partially formed during the concentrating of the cane juice), residual acid, converted complexes or acid reacted sugar cane impurities, water and pectin.

The sucrose crystals comprise the discontinuous or dispersed phase whereas the other ingredients including the invert sugar solids, acid, acid reacted sugar cane impurities, water and pectin comprise the continuous phase which continuous phase is in the form of a semi-plastic gel.

The continuous phase which is present in the form of a semi-plastic gel is always present in a minor proportion to the dispersed or discontinuous phase of the sucrose crystals. These sucrose crystals may be of varying size but they are crystalline in form and are dispersed throughout the semi-plastic gel.

The solidified mass thus obtained is a concentrated, homogeneous, solid, stable, nonvolatile, nonoxidizable, fruit flavored product which will withstand wide temperature ranges, is nonhygroscopic in spite of its high acidity and may readily be used in the manufacture of a wide variety of food products.

The cane juice utilized in accordance with the present invention may previously, where desired, have been defecated as by the use of lime or similar treatment. This cane juice is objectionable in flavor, readily fermentable, unstable and subject to rapid inversion of the sugars which it contains, whereas after the present treatment the cane juice is stable, nonfermentable, and has a highly desirable flavor and aroma.

The type of fruit flavor obtained in the solid mass may be controlled by the degree and method of defecation of the cane juice. For example, where the product is made from highly defecated cane juice more of an apple type flavor is obtained in the final mass whereas when a non-defecated cane juice is used, more of a prune type flavor is obtained.

This is accomplished although the product is altogether devoid of the essential oils which are responsible for the apple or prune flavor normally contained in those materials.

The cane juice containing between 0.25% and 2.5% ash based upon total solids and preferably between 0.5% and 1.5% ash based upon total solids is first desirably concentrated to between 50 and 70 Brix. The modification of the concentrated cane juice by the acid may be accomplished by adding all of the acid but it is preferable to add not more than about one-half of the total acid required, following which the concentrated, partially acid reacted cane juice is further concentrated to between 85 and 95 Brix, at which point the balance of the acid is added so as to increase the acidity to between pH 2.5 and 3.6.

The acidity thus adjusted to between pH 2.5 and 3.6 appears to be the critical limits, but preferably in order to obtain the most desirable results of the present invention the pH is adjusted to between pH 3.1 and pH 3.4, which acidity appears to complete the modification of the objectionable tasting materials and to give a highly desirable fruit aroma and flavor and which fruit flavor is further enhanced and improved by the subsequent addition of a small amount of pectin, and which fruit aroma and flavor are non-oxidizable, stable and nonvolatile even at temperatures of 250° F. to 260° F.

There is desirably utilized for acidification of the cane juice the polycarboxylic aliphatic acids and including particularly the food acids such as tartaric acid, citric acid and malic acid and less preferably their acid salts. Among other acids that may less desirably be used are included lactic acid, glycollic acid and phosphoric acid and less desirably hydrochloric, sulphuric and similar acids or their various acid salts. Other acids which may be utilized are the dibasic acids such as succinic and malonic acid as well as the sugar acids such as gluconic acid and saccharic acid. The acids themselves should be free of noticeable flavor and are used for the sole purpose of reacting with the non-sugar impurities of cane juice in order to produce the fruit flavors of the present invention and the acids must be added in a sufficient quantity to produce the effective acidity in terms of pH concentration as indicated. It has not been found desirable, however, to use reducing acids of the nature of sulphurous acid or oxidizing acids such as nitric acid which appear to form objectionable constituents.

The amount of acid to be added is quite critical and it may be controlled in accordance with the ash content of the cane juice or similar sugar containing juice.

In order to obtain the desired nonvolatile fruit flavor and aroma it is necessary to add between about 25 and 200 parts and desirably between 75 and 150 parts of tartaric acid or its acid equivalent based upon the standard pH scale to each 100 parts of ash on total solids in the cane juice.

For example, to defecated cane juice containing 1.0% ash on total solids there is added between 0.75% and 1.5% and preferably an equal amount by weight of tartaric acid or its acid equivalent to obtain the desired pH and the desired fruit flavor.

It is then desirable to add a relatively small amount of pectin to permit the satisfactory formation of the brick or solid mass herein described and to obtain the most desirable and most concentrated stabilized fruit flavor. The amount of pectin required to produce the solid mass of the present invention is determined by the total quantity of sugars present in the liquid phase of this solid mass or brick after crystallization of the sucrose has been completed.

There is added between 0.75 and 2.75 parts of pectin and most desirably between 1.0 and 1.5 parts of pectin to each 100 parts of sugar solids dissolved in the continuous jellified phase of this brick.

The finished brick will contain not less than about 60% sucrose and preferably will contain 80% or more of sucrose, the large proportion of which is in crystallized, solidified form and occupies the discontinuous phase which is enclosed in the continuous phase comprising the acid reacted non-sugar impurities, pectin, invert sugar solids, water and enough sucrose to establish an equilibrium in the aqueous continuous phase.

The amount of invert sugars in the continuous phase may be adjusted within limits dependent upon the amount of free moisture which it is desired that the finished product will contain. Where it is desired to produce a brick of substantially low moisture content having, for example, less than about 5% total moisture, the invert sugar solids contained in the finished brick will not exceed about 3% of the total sugar solids whereas if it is desired that the finished brick will contain in excess of about 5% total moisture, which moisture is present in the continuous phase and which carries the other ingredients, the amount of invert sugar solids will be in excess of 5%, for example, against the total sugar solids present, but in no event is the sucrose less than 60% of the total sugars and desirably the sucrose is present in the amount of 80% or more of the total sugars.

Furthermore the amount of total solids present in the aqueous continuous film surrounding the sucrose crystals will be not less than 65% and desirably will be in excess of 75%.

The brick or solid mass thus obtained by the addition of approximately 1 part of pectin to 100 parts of total sugars present in the continuous phase of the brick is in stable, homogeneous, non-inverting, non-oxidizable, and readily solubilized condition and even at the high acidity and at the pH of about 3.1 to 3.4 required to produce the fruit flavor of the present invention is not subject to hygroscopicity or to further inversion of the sucrose contained therein.

The concentrated, acid reacted cane juice thus obtained assumes the character of a fruit with no characteristic whatsoever of the original cane juice or of any cane product or byproduct including raw sugar, refined sugar, and molasses.

As the preferred procedure of the present invention, the cane juice is first defecated in a suitable manner such as by treatment with lime. The defecated cane juice is then concentrated to between 50 and 70 Brix.

At this point approximately half of the acid is added to cause the first reaction or modification of the defecated cane juice impurities and then the concentrating is continued to between 85 and 95 Brix at which point the balance of the acid is added to adjust the pH to between 2.5 and 3.6 and desirably to between pH 3.1 and 3.4.

The defecated cane juice in unconcentrated or concentrated condition or before or after acidification may be filtered through bone char or charcoal where a lighter colored product is desired or, where clarification is desired, through diatomaceous earth or similar filtering medium.

There is added to the acid reacted, concentrated, defecated cane juice a relatively small amount of pectin, the pectin desirably first being prepared in aqueous solution as by preparing a 3% to 4.5% pectin solution, adding the pectin solution to the cane juice product desirably with agitation, and then preferably concentrating to the moisture content which existed prior to the addition of the pectin or to the moisture which it is desired the brick or mass will contain.

This acid reacted, concentrated, defecated cane juice composition with the pectin or pectin material added and thoroughly distributed therethrough is desirably caused partially to solidify, until the two phases constituting the crystallized sucrose on the one hand and the liquid phase which includes invert sugars, acid reacted impurities, water, pectin and a small portion of dissolved sucrose on the other hand are distinctly formed or visible.

The composition thus obtained is then poured into molds such as into boxes, barrels, or into suitable containers where it is allowed to cool and solidify completely whereupon, within a period of about 30 to 45 minutes, there is formed a solidified mass comprising the sucrose crystals which are surrounded by the continuous phase of the film containing the various ingredients.

As an alternative procedure the concentrated acid reacted cane juice composition may be agitated until the two phases of the crystallized sucrose and the noncrystallized portion are distinctly formed or visible and at that point the pectin solution may be added in the desired proportion and following thorough admixture of the pectin solution with the entire mass, making certain that the pectin is thoroughly distributed throughout the noncrystallized fraction, the finished product may then be poured into molds and allowed to cool and completely solidify.

As a further less desirable alternative procedure, the concentrated acid reacted cane juice composition may be concentrated to between 85 and 95 Brix and preferably to about 95 Brix after which the desired amount of pectin solution is added with agitation and the entire mass is thereupon concentrated further to the desired moisture content. The combination is then allowed to crystallize partially in the above described manner and at that point where the crystallized portion has substantially formed, the desired amount of acid is added to reduce the pH to between 2.5 and 3.6. The combination of acid and pectin may also be added to the entire mass simultaneously at the time that the major proportion of the sucrose has been allowed to crystallize, but this is a less preferable procedure than those outlined above.

As a specific example of the utilization of the present invention, the following may be noted:

*Example I*

1000 pounds of cane juice which had been concentrated to 20 Brix was found to contain approximately 1% total ash based upon total solids, and of its total sugar content 5% was present as invert sugars and approximately 95% as sucrose.

There was prepared a solution containing 2 pounds tartaric acid in 2 pounds of water. The concentrated cane juice of 20 Brix was further concentrated to 60 Brix, at which time 2 pounds of the 50% solution of tartaric acid was added. The partially acid reacted or modified cane juice containing one-half of the total acid was further concentrated to 95 Brix at which time the balance of 2 pounds of the 50% tartaric acid solution was added and the pH of this concentrated acid reacted cane juice was found to be pH 3.05.

The product was then concentrated to return it to 95 Brix.

The product was then agitated and allowed partially to cool until a large proportion of the sucrose crystals had been formed. The remaining liquid phase included the invert sugars, acid reacted non-sugars, residual acid and water together with a small amount of dissolved sucrose. At this point there were added to the mass with agitation 135 grams of pectin previously dispersed in cane juice liquor. The mass was further agitated for about 15 minutes at which time the product was poured into wooden boxes and allowed to solidify and cool forming the hard, solid mass.

It may be noted from the above that the 1000 pounds of cane juice in this example contained 200 pounds of total solids of which 2 pounds or 1% was ash. The amount of acid which was added was about 2 pounds or an equivalent weight with the amount of total ash in the cane juice. Furthermore, it was estimated that in the above brick there were contained in the continuous phase 13.500 grams of total sugar solids and therefore based upon the use of preferably 1 part of pectin to each 100 parts of sugar solids in the continuous film, there were added 135 grams of pectin in order to produce the brick of the present invention.

The bricks or solid masses of the present invention may very readily be utilized in the production of a wide variety of fruit flavored food products.

For example, they may be used in the baking industry, for confectionery purposes, in the production of jams and jellies, for beverages, in the preparation of alcoholic beverages or cordials, for ice cream, sherbets or ices, for individual tablets or brickettes and for similar food compositions.

The bricks or solid masses thus obtained have great advantage in being available for shipment at extremely low cost without requiring the use of containers and occupying a minimum amount of space in the holds. Furthermore, these bricks are stable, homogeneous, noninverting, nonoxidizable and nonperishable and will remain uniform over long periods of time.

It has been surprisingly found that even though the bricks or solid masses are cut and upon cutting may expose a tacky surface, upon further standing for 12 to 24 hours, the continuous and discontinuous phases on the cut surfaces readjust themselves to reform the hard surface of the original brick before cutting.

For example, where the brick has been prepared to contain in excess of about 8% total moisture and preferably about 8% to 12% total moisture, the finished product is chewy so that the product in that form may be used as a confection without requiring the addition of substances that otherwise would be needed to give a chewy effect such as caramelized or boiled milk solids with or without fat, neither of which products need be present in the brick or solid mass of the present invention.

Furthermore, where large bricks or blocks of 10 pounds to 100 pounds weight are first prepared and where those blocks are then recut or reformed into the desired size as for use in the manufacture of confections, the exposed surfaces which at this higher moisture content may normally be tacky when first cut are within a relatively short time reformed into hard surfaces so that the product may be wrapped or otherwise used as a confection to give a finished product of extremely low cost, perfectly stable and homogeneous, noninverting, nonperishable, and nonoxidizable and having the desirable fruit flavor of the present invention.

Furthermore, the brick or bars may be reconstituted by dissolving in water or other aqueous medium or where a low moisture containing brick is made, by placing into finely divided condition and using for bakery purposes, confectionery purposes, ice cream, beverages, etc.

Where it is desired to prepare a jam or jelly from these bricks, the bricks may be reconstituted in water to about 65 Brix and the pectin deficiency may be compensated for by addition of more pectin.

Example II 100 pounds of the brick made in accordance with the procedure of Example I were dissolved in 50 pounds of water. At this point 393 grams of pectin were added by first dissolving the pectin in water to make a 4.5% solution. The mixture was then further concentrated to about 65 Brix and upon cooling a fruit jelly formed within 30 minutes to 1 hour. This fruit jelly was found to be perfectly stable and homogeneous and could be kept for long periods without change or loss of original flavor.

It has furthermore been found that where it is desired to make a jelly of higher density the process of the present invention is ideally suited for that purpose.

Example III 100 pounds of the brick made in accordance with the procedure of Example I were redissolved in 100 pounds of water. The combination was then concentrated to 85 Brix at which time 393 grams of pectin were added by first dissolving the pectin in a sugar syrup. The mixture was then reconcentrated to the prior 85 Brix. At this point the finished product was still free flowing and did not "set" for a period of between 45 minutes and 1½ hours which gave sufficient time for the product to be cast into molds. The product then "set" in the molds and a highly desirable fruit flavored, homogeneous, concentrated jelly or gum was formed.

In the preparation of a concentrated jelly, the total solids can be adjusted within any desired range such as by concentrating to from 75 to 90 Brix dependent upon the finished product desired.

It is particularly surprising to find that in accordance with the procedure outlined in Example III the product does not rapidly or prematurely "set" without giving time to place in molds as is normally encountered in the preparation of the usual type of concentrated jellies. Under normal conditions where a jelly is made from a fruit juice and sugar, for example, there is insufficient time available to place the finished product into molds and the product goes from a liquid state into a gel almost instantaneously. On the other hand, in accordance with the procedure of the present invention, the "setting" is naturally retarded and sufficient time is afforded for the proper packaging and handling of the finished product.

Furthermore, in accordance with the present invention, the amount of acid that is added is very substantially in excess of that which would enable one otherwise to produce a satisfactory product such as is required in the preparation of an ordinary fruit jelly. The acid that is added in accordance with the present invention is five to eight times or more that which it would be possible to add with any pectin solution in the preparation of a standard fruit jelly without damaging the normal jelly structure.

Furthermore, by the addition of this excessive amount of acid in the preparation of a jelly having the enhanced fruit flavor, there results a reaction to, first of all, produce the fruit flavor that is so highly desirable and, secondly, permit proper jellification notwithstanding this high acid content.

Normally, in the preparation of a fruit jelly, for example, with each 1 part of pectin there is added not over about ¼ part to ⅓ part of tartaric acid or its acid equivalent. If the amount of acid is in excess of this ⅓ part, then the jelly does not form because the jelly would only form at a pH of between about 3.0 and 3.5 but if more than ⅓ part of acid is added and if the pH is lower than 3.0, as would be the case if an excess amount of acid is added, then no jelly would be obtained.

In accordance with the procedures of the present invention, however, there is added between 4 and 12 times the amount of acid that would be normally required to produce a standard fruit jelly and in spite of this high amount of acid added, the pH is then within the desired range of about 3.1 to 3.4 and the solid mass of the present invention may by the procedure outlined above be converted readily into a jelly.

Strangely, the fruit characteristic of the acid reacted cane juice appears to be a combination of currant, wild raspberry and prune with the objectionable characteristics of the cane juice entirely gone. Where defecated cane juice is utilized in the production of the brick in accordance with the present invention, more of an apple flavor and a lighter colored product is obtained. The ash content of the cane juice or similar composition should not exceed 2.5%, and desirably is in the range of 0.5% to 1.5%.

The ash content may, however, be adjusted by blending or admixture with other intermediate sugar products or sugar residues or by the addition of sucrose or other sweetening agents in order to reach the desired ash content.

For example, if a nondefecated cane juice is used and if that cane juice contains an excessive quantity of ash as, for example, 3.5%, then it is desirable to add an additional amount of sucrose or other sweetening agent in order to reduce the ash content to the desired point which will produce the fruit flavor and which is desirably between about 0.5% and 1.5% total ash based upon total solids.

The pectin used to form the solid mass or block does not appear to act in the same manner that it would in producing a standard fruit jelly but the pectin in combination with the high acid and the other ingredients present in the continuous phase appears to form a plastic, somewhat resinous film which serves to protect and preserve the sucrose crystals which are contained in the discontinuous or dispersed phase and to enhance the fruit flavor.

Where the bricks or bars prepared in accordance with the present invention are subsequently to be used in the manufacture of a jelly, additional pectin may be required but there is taken into consideration the amount of pectin originally added which amount is deducted from the total amount of pectin required to produce the desired jellification.

Where, however, the bricks are to be utilized by placing into finely divided condition and/or by dissolving in water or other aqueous medium, as for use in the manufacture of ice cream, ices, bakery products, confectionery products or beverages, then no additional pectin need be added.

In any event, the proper ratio between the ash and the acid must be so maintained as to completely react the acid with the non-sugar impurities so as to develop the flavor and aroma of the present invention.

Furthermore, it has been found that where the cane juice has been subjected to treatment with sulphur dioxide or sulphurous acid, the acid reaction of the present invention appears to be inhibited and the fully desirable results of the present invention are not obtained.

Of particular importance is the fact that these novel flavors are produced in substantially nonvolatile condition so that when used in the manufacture of other foods where additional concentration or boiling is employed, the aromatic constituents and flavor complexes are not volatilized out are fully retained.

The nonvolatile character of the fruit flavor obtained in accordance with the present invention is of particular importance for all food products where high temperature treatment is involved particularly in the manufacture of the so-called confectionery gums.

These gums are now limited to the use of artificial flavoring ingredients which artificial flavors, consisting principally of essential oils, are added at the close of the boiling treatment because of their high volatility. The natural fruit juices do not withstand the high and prolonged cooking temperatures to which the confectionery gums are subjected and therefore the natural fruits and fruit juices are not used in the production of the confectionery gums.

However, in accordance with the procedures of the present invention the cane juice or similar composition may very readily be employed in the production of these confectionery gums since prolonged and high temperature cooking does not appear to affect their intensity or desirability of fruit flavor and the finished confectionery gum or similar product which has been subjected to extensive and prolonged high temperature treatment will retain its natural desirable fruit flavor.

Furthermore, in accordance with the present invention a solid mass of high concentrated food value and which appears to be compressed but which does not require compressing is obtained, which product although in acid condition reverts to an alkaline condition upon ingestion, and there are retained the natural vitamin values, minerals and other constituents originally present in the cane juice although in reacted form.

Where the solidified cane juice composition in brick, bar, granule, flaked or similar form produced in accordance with the present invention is to be subsequently treated with acid in its final use in the manufacture of a food product, the acid reaction may, where desired, be withheld until the brick or bar is ready for final utilization. Under this less preferable procedure a stable, noninverting product is obtained but by reason of the acid reaction with the non-sugar impurities not having been completed, the product does not have any characteristic of a fruit and where nondefecated cane juice, for example, is employed the brick may be quite objectionable in taste until the acid reaction has been completed.

One of the most desirable features of the present invention is that the product of the present invention will greatly enhance and support other fruit flavors and serves as a better base for all fruit flavors since with less addition of flavor, a stronger flavor is obtained.

For example, the addition of only about ¼ to ⅒ the amount of peaches or peach flavor or cherries or cherry flavor is required when used in combination with the cane juice composition of the present invention to give the same intensity of flavor and aroma as would normally be required by the full quantity of peaches or cherries. This is of great importance in connection with the manufacture of jellies, and also in the production of canned fruits, fruit syrups, and fruit juices.

Furthermore, when the products of the present invention are utilized in this manner they will contain no artificial flavor, coloring matter or preservative and are high in intrinsic food value so that by the procedures of the present invention a product of low economic value and containing materials that are normally converted into waste products is changed into materials of high economic value.

One of the most unusual characteristics of the products produced in accordance with the present invention is that the flavors are non-oxidizable and will retain their original flavor and aroma characteristics over long periods of time without change or diminution.

Whereas normally the flavors in food products are very readily oxidizable so that upon exposure to air or light or upon storage they lose their natural flavor characteristics or they develop objectionable flavor characteristics; or whereas other food products having certain aromas and flavors contain the aromas and flavors in the form of highly volatile essential oils, the products of the present invention have flavors which are non-oxidizable and substantially non-volatile.

For example, the products made in accordance with the present invention may be boiled over long periods of time or carried at elevated temperatures without loss or diminution of their natural flavors or they may be stored for a period of two or more years even under conditions of relatively high temperature and humidity or upon exposure to light and the flavors are still retained.

The products produced in accordance with the present invention have the great advantage of being more readily dispersible and soluble when placed into solution than are similar products which do not contain the sucrose crystals surrounded by the continuous phase of the plastic film of the described products.

The ready solubility and dispersibility of the products of the present invention are also of great importance when these products are eaten so that they are readily chewable or dissolved when placed upon the tongue or so that they may be readily solubilized or dispersed when used for manufacturing purposes in the preparation of other food products.

The fruit flavor obtained in accordance with the procedures of the present invention appears to result principally from the acid reaction with the non-sugar constituents of the cane juice and which fruit flavor is further enhanced and becomes more readily apparent upon treatment with pectin in accordance with the procedures outlined.

Together with or in lieu of the cane juice, it has also been found possible to utilize in accordance with the present invention raw sugars and brown sugars, sometimes referred to as soft sugars, provided that the ash content amounts to or has been adjusted to between 0.25% and 2.5% total ash based upon total solids and desirably to between the preferred proportions of 0.5% and 1.5%.

Where the ash content of these raw sugars or soft sugars must be adjusted to come within the critical ash limits, or where raw sugars or soft sugars are utilized, the non-sugar impurities must also resemble qualitatively the non-sugar impurities of the original cane juice. If during the refining processes or by using combinations of sugars with intermediate products the non-sugar impurities no longer resemble qualitatively the non-sugar impurities of the cane juice as, for example, if an excess amount of soluble salt has been introduced during the refining processes through the introduction of refining media so as to change the qualitative resemblance of these non-sugar impurities, then the desired products of the present invention are not obtained and even though the quantitative critical limits may be reached, the qualitative critical limits have not been satisfied.

Together with or in lieu of the cane juice, there may also be utilized other sugar cane products containing between 0.25% and 2.5% ash and desirably between 0.5% and 1.5% ash based upon total solids and which ash qualitatively resembles substantially the ash of cane juice.

For example, a combination may be prepared comprising refiners syrup or molasses and which has an ash content of 6%, for example, and other sweetening agents such as sucrose or other crystallizable sugars in order to reduce the ash content to the desired level which is preferably between 0.5% and 1.5%.

The refiners syrup or molasses in combination with the sweetening agent must contain or must be adjusted by proper addition to contain at least 60% total crystallizable sugars based upon total solids and preferably 80% or more crystallizable sugars based upon total solids.

The ash content must also be quantitatively adjusted as indicated and also the non-sugar impurities must resemble qualitatively the non-sugar impurities of cane juice. Furthermore, the acid must be added in a sufficient excess quantity to produce a pH of between 2.5 and 3.6 and which will require between 0.75 and 2 parts of tartaric acid or its acid equivalent to each 100 parts of ash based upon total solids.

Together with or in lieu of the cane juice or similar cane material it is also possible although less preferable to use other sugar juices or sugar products containing natural non-sugar impurities which are produced from the sugar beet and sorghum and less preferably from maple and other sucrose bearing plants, and which products may be used in any of the above described manners.

Particularly in the case of beet juice or beet molasses combinations with sweetening agents or intermediate beet sugar products, it has been found desirable at some stage in the processing and preferably in the treatment of the original juice before or after suitable defecation to place the beet material through charcoal, bone char or subject it to similar treatment. The beet juice or similar composition must, however, contain between 0.25% and 2.5% total ash and desirably between 0.5% and 1.5% total ash and furthermore the non-sugar impurities of this beet composition must also resemble qualitatively the non-sugar impurities as substantially contained in the original beet juice.

The term "pectin" as used herein is understood to mean pectin of definite graded strength. However, with suitable modifications it also includes pectic acid and the pectins of varying degrees of demethoxylation.

The term "ash" is used herein to describe those products made from the non-sugar impurities which are left upon ultimate combustion.

By the term "cane juice" there is included not only the juice which is extracted or expressed from the sugar cane which may where desired have been defecated, but there is also included combinations of intermediate cane sugar products such as molasses, which combinations have been obtained by the addition of sucrose or other sweetening agents to the intermediate products to produce the same quantitative and qualitative non-sugar impurities as are present in the original sugar cane juice. For the purpose of the present invention, however, the ash content must be maintained at a point between 0.25% and 2.5% and desirably between 0.5% and 1.5%.

It is possible but much less desirable to obtain the solid mass of the present invention by forming a brick or bar with amorphous sugar particles commingled with the plastic film comprising the acid reacted or acid modified cane juice impurities, water and pectin.

The non-sugar impurities of the present invention are those which occur in sugar bearing plants as in cane, beet and sorghum juice and which include particularly the inorganic salts and other constituents naturally occurring therein.

Having described my invention, what I claim is:

1. A fruit flavored, stable, nonhygroscopic, solid sugar composition comprising a high proportion of solidified and crystallized sucrose occupying the dispersed phase and surrounded by the continuous phase of a jellified pectin containing and sugar containing film, said sugar composition having a pH between 2.5 and 3.6 and containing the non-sugar, water dispersible, ash forming solids derived together with raw sugar from a sugar bearing plant selected from a group consisting of sugar cane, sugar beet and sugar sorghum.

2. A fruit flavored, stable, nonhygroscopic, noninverting cane sugar composition comprising at least 60% crystallized sucrose based upon total sugar solids in a discontinuous phase, said crystallized sucrose being surrounded by a plastic film containing invert sugars, non-sugar water-dispersible ash-forming solids, water, and a relatively small amount of pectin, said composition having a pH between 2.5 and 3.6, the ash content of said composition being equivalent to between 0.25% and 2.5% based upon total solids.

3. A fruit flavored, stable, nonhygroscopic, noninverting solid sugar composition comprising at least 60% sucrose, based upon total sugar solids, at least 5% invert sugars, at least 1 part pectin to each 100 parts dissolved total sugar solids, the percentages based upon total solids, and having a pH between 2.5 and 3.6 and containing the non-sugar, water dispersible, ash forming solids derived together with raw sugar from a sugar bearing plant selected from a group consisting of sugar cane, sugar beet and sugar sorghum.

4. A process of producing stable, nonhygroscopic, noninverting sugar compositions which comprises adding to a concentrated sugar material carrying in excess of 60% sucrose based upon total sugar solids and having a pH between 2.5 and 3.6, a relatively small amount of pectin at between 85 and 95 Brix and allowing to solidify whereby the large proportion of sucrose crystals which are in dispersed condition are surrounded by a stable, noninverting jellified film of invert sugars, non-sugar solids and pectin, said invert sugars, non-sugar solids and pectin being present in said film in relatively small quantity and said pectin being present in insufficient amount to jellify the sucrose present and said solids being derived together with raw sugar from a sugar bearing plant selected from a group consisting of sugar cane, sugar beet and sugar sorghum.

5. A stable, nonhygroscopic, solid sugar composition comprising crystallizable sugars which are present in an amount of at least 60% based upon total sugar solids in a discontinuous phase, said crystallizable sugars being surrounded by a noninverting jellified film containing invert sugars, non-sugar water-dispersible ash-forming solids, water, and a relatively small amount of pectin, said non-sugar substances being derived from sugar bearing plants.

6. A stable, nonhygroscopic, solid sugar composition comprising sugars in a discontinuous crystallized phase which are present in an amount of at least 60% based upon total sugar content, said crystallized sugars being surrounded by a plastic film containing invert sugars, non-sugar water-dispersible ash-forming solids, water, and a relatively small amount of pectin.

7. A stable, nonhygroscopic, solid raw sugar composition comprising sugars in a discontinuous crystallized phase which are present in an amount of at least 60% based upon total sugar content, said crystallized sugars being surrounded by a plastic film containing non-sugar, ash forming, water dispersible substances normally present in raw sugar, and a relatively small amount of pectin insufficient to jellify the sugar present, said sugar composition being selected from the group consisting of cane sugar, beet sugar and sorghum, and said non-sugar substances being those which are present in the named sugar compositions.

8. A fruit flavored, stable, nonhygroscopic, noninverting, acid modified raw sugar composition comprising at least 60% crystallizable sugars based upon total sugar content, said crystallizable sugars occupying a discontinuous phase and surrounded by a continuous phase of a noninverting plastic film containing non-sugar, ash forming, water dispersible substances normally present in raw sugar, and a relatively small amount of pectin insufficient to jellify the sugar present, said non-sugar substances being those which are present in a sugar syrup selected from the group consisting of cane juice, beet juice and sorghum juice, said sugar composition having a pH between 2.5 and 3.6 and said sugar composition having an ash content of between 0.25% and 2.5% based upon total solids.

9. A solidified fruit flavored raw cane juice composition having an ash content of between 0.25% and 2.5% based upon total solids, said cane juice composition having a pH of 2.5 to 3.6, and carrying a relatively small amount of pectin, said ash being that naturally present in the raw sugar.

10. A process of producing a nonhygroscopic, noninverting, stable raw sugar composition which comprises preparing a raw sugar material selected from the group consisting of cane sugar, beet sugar and sorghum, said sugar material carrying between 0.25% and 2.5% ash based upon total solids, and carrying at least 60% sucrose based upon total sugar content, concentrating said material to at least 85 Brix, acidifying to between pH 2.5 and 3.6, adding thereto at least 0.75 parts of pectin for each 100 parts of total sugar content and allowing to solidify, said ash being that naturally present in the raw sugar.

11. A process of producing a nonhygroscopic, noninverting, stable, fruit flavored sugar composition which comprises preparing a raw cane sugar material carrying between 0.25% and 2.5% ash based upon total solids, concentrating said material to at least 85 Brix, adding thereto with agitation between 0.75 and 2.75 parts of pectin for each 100 parts of dissolved sugars, adding thereto sufficient acid to produce a pH between 2.5 and 3.6, and allowing to cool and solidify, said ash being that naturally present in the raw sugar.

12. A process of making an edible, stable, nonhygroscopic, solid raw sugar composition which comprises concentrating raw cane juice until the juice contains about 1% total ash and until 5% of its total sugar content consists of invert sugars and 95% consists of sucrose, adding a solution of 50% tartaric acid, further concentrating, again adding a solution of 50% tartaric acid, agitating the product and cooling it until sucrose crystals have been formed therein, and adding with agitation a small amount of pectin insufficient to jellify the sugars present and then permitting the mass to solidify and cool to form a solid hard mass.

13. A process of making an edible, stable, non-hygroscopic, solid raw sugar composition which comprises concentrating about 1000 pounds of cane juice to about 20 Brix and until it contains about 1% total ash based upon total solids and until 5% of its total sugar content consists of invert sugars and 95% of this content consists of sucrose; further concentrating to 60 Brix and adding about 2 pounds of a solution of 50% tartaric acid, concentrating to about 90 Brix, adding a solution of about 2 pounds of 50% tartaric acid and adjusting the pH to about 3.05, again concentrating to adjust to 95 Brix, agitating the product and cooling it until sucrose crystals have been formed therein, and adding with agitation about 135 grams of pectin and then permitting the mass to solidify and cool to form a solid hard mass.

ALEXANDER M. ZENZES.